United States Patent Office 3,387,925
Patented June 11, 1968

3,387,925
POLYMER SUSPENSION STABILIZER
Reginald E. Vanstrom, Dobbs Ferry, N.Y., and Fred McCollough, Jr., Jacksonville, Ill., assignors to Stauffer Chemical Company, New York, N.Y., a corporation of Delaware
No Drawing. Filed Mar. 16, 1966, Ser. No. 534,679
7 Claims. (Cl. 23—109)

This invention relates to a polymer suspension stabilizer and more particularly to a novel process for its preparation.

The stabilizer used in this invention is tricalcium phosphate hydroxylapatite, which is hereinafter referred to as "TCP" or "tricalcium phosphate" in deference to common usage. Although tricalcium phosphate has been used in the past as a suspension stabilizer, it has been unsatisfactory to some degree because of its tendency to agglomerate upon drying and form large particles unsuitable for suspension polymerization. The small particle sizes required (predominantly below 1 micron) have been achieved only with difficulty by various milling steps.

The process for preparing tricalcium phosphate is well known and involves slowly adding phosphoric acid to a lime slurry (about 2–3 hours for 3,000 gallon reaction volumes) at a temperature between about 70° C. and 80° C. until the pH is nearly neutral and then filtering and drying the resultant "wet cake" which has an overall solids composition corresponding to a $CaO/P_2O_5$ mole ratio near 3. The dried product is then milled in one of several ways to reduce the average particle size and render the tricalcium phosphate suitable for use as a polymer suspension stabilizer. This milling step is expensive and the results are often inconsistent.

It is accordingly an object of this invention to provide a tricalcium phosphate having an average particle size sufficient for suspension polymerization.

It is a further object of this invention to provide a process for preparing tricalcium phosphate, which process favors the precipitation of fine particle size tricalcium phosphate and which obviates the need for drying and milling the precipitated tricalcium phosphate.

Other objects of this invention will be apparent from the detailed description and explanation of the invention which follows.

We have now discovered that the difficulty in milling tricalcium phosphate to a fine particle size is most often a result of allowing the tricalcium phosphate to precipitate in the form of large particles and further permitting the agglomeration of these particles by removing all water bound therein. By more stringently controlling the reaction conditions, tricalcium phosphate can be produced preferably without milling, having a particle size sufficiently small for suspension polymerization. Moreover, it is often not practical to duplicate this particle size when the tricalcium phosphate is dried and subsequently milled. We have found that a smaller particle size may be produced by controlling the final pH, the reaction temperature, the rate of addition of the reactants and then using the filtered precipitate or wet cake as the suspension stabilizer and thereby eliminate the drying and milling steps. Moreover, not only is the process less expensive because of the elimination of the drying and milling requirements, but a saving is realized of up to 40% of the tricalcium phosphate normally required to stabilize a like amount of polymer. It is believed that this saving is due to the fact that the average particle size is smaller than heretofore and thus less tricalcium phosphate is required to coat a like amount of monomer. Where shipping costs in transporting the wet cake are prohibitive, the TCP is dried and milled and is still superior to that produced heretofore.

In conducting the reaction according to our invention, the temperature of the reaction should be maintained between 20° C. and about 50° C. and preferably between 30° C. and 40° C. and the phosphoric acid should be added to the lime slurry as quickly as possible. Since the reaction is exothermic, this requires balancing the rate of addition with the capacity for regulating the temperature of the reaction. For 3,000 to 10,000 gallon reaction volumes reacting 20% aqueous orthophosphoric acid and hydrated lime containing 1 pound of calcium oxide per gallon of water the acid addition is completed in from about 20 to about 66 minutes and preferably from 25 to 55 minutes. It is therefore desirable to adjust the lime slurry to a temperature of at least about 25° C. before the acid addition is begun. The rate of addition will vary but generally more rapid additions are permitted with large volumes. Dilute aqueous orthophosphoric acid (about 20%) is preferred so that the mixture does not become acidic in local areas due to the rapid addition of phosphoric acid. The lime slurry (about one pound calcium oxide per gallon of water) is continuously agitated to prevent high local concentration of acid in the mixture and the aqueous phosphoric acid is added until the lime slurry is neutralized to a pH of between about 6.7 and about 8.5, preferably between 6.8 and 7.5. Agitation is continued for an additional ten to thirty minutes to insure completion of reaction. The precipitate is filtered under reduced pressure to remove the surface water and the resultant wet cake set aside for incorporation with the monomer or subsequent drying and milling.

The methods of determining submicron particle diameters are very limited. However, TCP is a suitable suspension stabilizer for styrene monomer when, in suspension polymerization of styrene, it yields monomer particles of which a major portion have a particle size between about −20 +40 U.S. Standard Mesh. The quality of the tricalcium phosphate for use as a suspension stabilizer with styrene monomer as well as other monomers is directly proportional to the percentage of stabilized particles within the aforesaid range.

The following non-limiting examples will serve to illustrate the preferred aspects of the invention.

Example 1

To a 12 liter stainless steel vessel equipped with 2 Lightnin stirrers and containing 6000 milliliters of 8% aqueous calcium oxide was added 2000 milliliters of 17% aqueous phosphoric acid, said addition requiring approximately 9 minutes. The temperature of the reaction mixture was maintained at 49° C. and the pH adjusted to 7.3 by the additional addition of approximately 200 milliliters of phosphoric acid. The above reaction was accomplished with the aid of vigorous agitation and the agitation was continued for an additional 10 minutes after the phosphoric acid addition was complete. The precipitate was filtered under reduced pressure and the wet cake found to contain approximately 70% water by weight. The TCP was then tested as a suspension stabilizer by the following procedure.

A suspension was prepared of 358 parts water, 2.5 parts 0.5% Nacconol solution (a sodium alkyl aryl sulfonate), 0.8935 part benzoyl peroxide, 1.54 parts TCP and 495 parts styrene. The temperature was maintained at 90° C. for 10 hours and the precipitated beads were filtered, washed with ethanol and air dried. Sievings were then made and the weight percentages calculated, and 82% of the monomer particles were between −20 +40 U.S. Standard Mesh.

Six additional samples were prepared, maintaining the temperature and rate of addition as much as possible to that of sample 1 and the results showing the effect of the final pH on the ability of TCP to stabilize styrene monomers is demonstrated in the following Table I.

TABLE I.—EFFECT OF pH ON TCP

| Sample No. | Reaction Temperature, °C. | pH | Percent Particles −20 +40 U.S. Mesh |
|---|---|---|---|
| 1 | 49 | 7.3 | 82 |
| 2 | 50 | 6.3 | 19 |
| 3 | 50 | 6.4 | 45 |
| 4 | 48 | 6.7 | 58 |
| 5 | 49 | 6.9 | 77 |
| 6 | 50 | 7.1 | 68 |
| 7 | 52 | 8.5 | 55 |

Example 2

Six additional samples were prepare in accordance with the procedure of Example 1, maintaining the final pH and rate of addition constant as far as possible; varying only the reaction temperature. The effect of temperature on tricalcium phosphate stabilization is shown in the following Table II:

TABLE II.—EFFECT OF REACTION TEMPERATURE ON TCP

| Sample No. | Reaction Temperature, °C. | pH | Percent Particles −20 +40 U.S. Mesh |
|---|---|---|---|
| 1 | 49 | 7.3 | 82 |
| 2 | 49 | 6.9 | 77 |
| 3 | 50 | 7.1 | 68 |
| 4 | 60 | 6.8 | 33 |
| 5 | 76 | 7.1 | 28 |
| 6 | 82 | 7.8 | 6 |

Example 3

Six samples were prepared in accordance with the procedure of Example 1, maintaining the temperature and pH constant as far as possible; varying only the rate of addition. The results are shown in the following Table III:

TABLE III.—EFFECT OF RATE OF ADDITION OF $H_3PO_4$ ON TCP STABILIZATION

| Sample No. | Addition Time (minutes) | Reaction Temperature, °C. | pH | Percent Particles −20 +40 U.S. Mesh |
|---|---|---|---|---|
| 1 | 9 | 49 | 6.9 | 77 |
| 2 | 9 | 49 | 7.3 | 82 |
| 3 | 9 | 50 | 7.1 | 68 |
| 4 | 24 | 48 | 7.4 | 43 |
| 5 | 24 | 48 | 7.4 | 34 |
| 6 | 24 | 49 | 7.3 | 46 |

Example 4

To test the effect of drying and milling the tricalcium phosphate wet filter cake, 350 gram portions of sample 6 of Example 1 were dried and milled and suspended with styrene according to the procedure of Example 1. The results are shown in the following Table IV:

TABLE IV.—EFFECT OF DRYING AND MILLING TCP WET CAKE

| Sample No. | Mill | Percent Particles, −20 +40 U.S. Mesh Before Drying | Percent Particles −20 +40 U.S. Mesh After Drying and Milling |
|---|---|---|---|
| 1 | Ball (−325 U.S. Mesh) | 68 | 14.3 |
| 2 | Ball (−400 U.S. Mesh) | 68 | 22.0 |
| 3 | Hammer | 68 | 3.2 |

Example 5

Four samples of tricalcium phosphate wet filter cake were prepared according to the procedure of Example 1, maintaining the temperature of the reaction mixture below 42° C., completing the addition of the acid in approximately 10 minutes for samples 1 and 4, and 25 minutes for Examples 2 and 3, and the pH of a 50% aqueous slurry of the filter cake was between 6.9 and 7.5. The samples were then tested as polymerization stabilizers with styrene according to the procedure of Example 1, varying only the ratio of TCP to styrene to determine whether smaller amounts of TCP wet filter cake could be used than was heretofore required when the TCP was dried and milled. The results are shown in the following Table V.

TABLE V.—EFFECT OF DRYING AND MILLING TCP WET CAKE IN QUANTITIES REQUIRED FOR POLYMERIZATION

| Sample No. | Percent Particles of Styrene, −20 +40 U.S. Mesh | Parts TCP Used In Polymerization |
|---|---|---|
| 1 (wet cake) | 40 | .86 |
| 2 (wet cake) | 23 | .86 |
| 3 (spray dried; screen mill) | (*) | 1.03 |
| 4 (tray dried; vertical mill) | 3.9 | 1.20 |

*Failure agglomeration.

Tricalcium phosphate is an effective suspension stabilizer for any ethylenic monomer and is especially effective with the vinyl aryl monomers such as styrene and vinyl naphthalenes. The beads of very uniform size are then compression molded to yield the polyethylene compounds.

We claim:
1. A process for preparing tricalcium phosphate having a particle size sufficient for suspension polymerization comprising rapidly adding dilute aqueous orthophosphoric acid to a vigorously agitated hydrated lime slurry for a period of time of between about 20 and about 66 minutes, in an amount sufficient to adjust the final pH of the reaction mixture to between about 6.7 and 8.5, while maintaining the temperature of the reaction mixture between about 20° C. and 50° C., and recovering the precipitated wet filter cake.

2. The process of claim 1, wherein the wet cake is milled and dried.

3. The process of claim 1, wherein the dilute aqueous orthophosphoric acid is added to the hydrated lime slurry in from 25 to 55 minutes.

4. The process of claim 1, wherein the final pH of the reaction mixture is adjusted to between about 6.9 and 8.

5. The process of claim 1, wherein the temperature of the reaction mixture is maintained between about 30° C. and 40° C.

6. The process of claim 1, wherein the aqueous orthophosphoric acid is added to the hydrated lime slurry for a period of time between about 25 to 55 minutes, the mixture is adjusted to a final pH of between about 6.9 and 8, and the temperature of the reaction mixture is maintained between about 30° C. and 40° C.

7. The process of claim 6, wherein the precipitated wet filter cake is dried and milled.

References Cited

UNITED STATES PATENTS 2,095,994   10/1937   MacIntire _____ 23—109
2,673,194   3/1954    Grim _____ 260—93.5

OTHER REFERENCES

Van Wazer, II: Phosphorus and Its Compounds, Interscience Publishers, Inc., 1961, pp. 1216–1217.

EARL C. THOMAS, *Primary Examiner.*

L. A. MARSH, *Assistant Examiner.*